Patented Mar. 16, 1954

2,672,400

UNITED STATES PATENT OFFICE 2,672,400

PREPARATION OF TITANIUM NITRIDE

Arthur E. Jacobsen, St. George, N. Y., assignor to National Lead Company, New York, N. Y., a corporation of New Jersey No Drawing. Application June 2, 1952, Serial No. 291,295

5 Claims. (Cl. 23—191)

This invention relates to a method for the preparation of titanium nitride. More particularly it relates to a method for producing finely divided titanium nitride.

Many methods have been proposed for the preparation of titanium nitride which include reacting titanium metal in a nitrogen atmosphere or reacting rutile ore or titanium dioxide with nitrogen in the presence of carbon at relatively high temperatures. In utilizing such methods the titanium nitride produced is either in a massive form or in a coarse-grained or highly sintered state. Such products cannot readily be ground to a finely divided state because of the abrasiveness and hardness of the titanium nitride composition. Such grinding procedures also produce impurities into the titanium nitride which is undesirable.

An object of this invention, therefore, is to provide a method for producing titanium nitride in finely divided form at relatively low temperatures. A further object is to provide a process for producing finely divided titanium nitride which has a relatively uniform particle size. A still further object is to produce a relatively pure titanium nitride which does not have to be subsequently ground and which is substantially free from impurities. These and other objects will become apparent from the following more complete description of the instant invention.

Broadly, this invention contemplates a method for the preparation of finely divided titanium nitride which comprises forming a molten mixture of reduced titanium halide and a halide of a metal selected from the group consisting of alkali metals and alkaline earth metals (including magnesium), introducing anhydrous ammonia into said molten mixture to react with said reduced titanium halide to form finely divided precipitate of titanium nitride and separating said precipitate from said metal salt.

In carrying out the process of the instant invention it is necessary to first form a molten mixture of a metal halide selected from the group consisting of an alkali metal and alkaline earth metal and a reduced titanium halide. By the term "reduced titanium halide" is meant either titanium trihalide or titanium dihalide both of which are soluble in molten alkali metal or alkaline earth metal halides. These reduced titanium halides may be prepared by any known method, for example, reacting titanium tetrahalide with a reducing metal such as sodium or magnesium or by the electrolytic reduction of titanium tetrahalide. The concentration of the reduced titanium halides in the molten salt bath may vary widely. However, for optimum efficiency it is desirable although not essential to employ concentrations of the reduced titanium halide from about 5% to 50% by weight in the molten mixture.

The anhydrous ammonium which is used to react with the reduced titanium halide is preferably added as a gas through a conduit positioned near the bottom of the molten salt mixture in order to have sufficient contact with the reduced titanium halides to completely react with the ammonia. During the ammonia addition it is particularly desirable to agitate the mixture in order to provide sufficient contact of the reduced titanium halides with the ammonia gas as it is bubbled through the molten mixture. Theoretically if sufficient contact is present during the addition of the ammonia, the amount of ammonia to be employed should approach stoichiometric quantities, however, in actual practice it is desirable to use an excess of ammonia which incidentally may be recovered and returned to the process. It is necessary to carry out the reaction at temperatures at which the mixture of halide salts is maintained in the molten state. It has been found preferable, although not essential, to carry out the reaction at temperatures from about 600° C. to 850° C.

The ammonia gas when introduced into the molten salt mixture reacts substantially instantaneously with the titanium values to form a precipitate of titanium nitride. After sufficient ammonia is introduced into the molten mixture, it has been found that substantially all of the titanium values are converted to titanium nitride precipitate. This precipitate may be allowed to settle to the bottom of the molten mixture and thereby separated from the molten metal halide. The separated precipitate of titanium nitride is then cooled and subsequently leached, preferably with dilute acid to remove the adhering metal halide from the titanium nitride. The leached titanium nitride is then deliquored and dried. The washed and dried precipitated titanium nitride possesses a very uniform and finely divided particle size. The range of particle size is from about 0.01 micron to 0.1 micron. The contents in the vessel should be kept under an inert atmosphere of argon during the reaction.

The titanium nitride may be produced by the process of this invention as stated above by the reaction of ammonia with reduced titanium halides. All of the halides are contemplated in the instant invention but because of the relatively high cost of utilizing iodides and the difficulties involved in handling fluorides, it is desirable to employ either bromides or chlorides and particularly, for economical reasons, chlorides are preferred.

In order to more fully describe preferred embodiments of the instant invention the following examples are presented:

*Example I*

In order to prepare a molten mixture of reduced titanium chloride and a metal chloride, the following procedure was carried out: 190 parts of titanium tetrachloride were introduced into a vessel containing 46 parts of sodium metal. The titanium tetrachloride was introduced as vapors and the sodium metal was agitated rapidly during the titanium tetrachloride addition. The molten mixture contained 117 parts sodium chloride, 107 parts titanium dichloride and 10 parts titanium trichloride.

The molten mixture was agitated rapidly and held at temperatures of 775° C. Through a conduit terminating near the bottom of the vessel were added 35 parts of ammonia gas. The reduced titanium chlorides in the molten mixture were substantially completely reacted with the ammonia to form finely divided precipitate of the titanium nitride. After the reaction was complete, the titanium nitride precipitate was allowed to settle to the bottom of the container after which it was removed from the molten mixture. The precipitated titanium nitride was then cooled and leached with 2% hydrochloric acid at 25° C. The absorbed metal chloride salts were readily removed. The finely divided titanium nitride after leaching was dried. The recovery of the titanium values was substantially 100% and the titanium nitride was uniform in appearance, texture and particle size. In fact, the size range was from .01 micron to .06 micron.

*Example II*

Using substantially the same procedure described in Example I, a molten mixture was prepared which contained the following analysis: 22.2% NaCl, 60.3% $SrCl_2$, 8.8% titanium trichloride, 8.7% titanium dichloride. Ammonia gas was again introduced into this molten mixture and substantially all of the titanium values were precipitated as titanium nitride. The temperature of the molten mixture during the reaction was held at 840° C. Substantially identical results were obtained as described in Example I and the quality and quantity of the titanium nitride produced was equal to that shown in Example I.

It has clearly been shown by the above description and by the examples presented that finely divided titanium nitride may be prepared by the process of the instant invention. The product is uniform in appearance, texture and particle size. Substantially all of the titanium values are recovered as titanium nitride by utilizing the process of the instant invention. The process is simple and efficient to operate. The product is produced in finely divided form, and does not require additional grinding which inherently introduces impurities into the product. The product is relatively free from metal halides which are substantially completely removed during the leaching operation.

While this invention has been described and illustrated by the examples shown it is not intended to be limited thereto and other modifications may be employed within the scope of the following claims.

I claim:

1. Method for the preparation of finely divided titanium nitride which comprises forming a molten mixture of reduced titanium halide and a halide of a metal selected from the group consisting of alkali metals and alkaline earth metals, introducing ammonia into said molten mixture to react with said reduced titanium halide to form a finely divided precipitate of titanium nitride and separating said precipitate from said metal salt.

2. Method according to claim 1 in which the reaction is carried out at temperatures from 600° C. to 850° C.

3. Method according to claim 1 in which a major portion of the reduced titanium halide is titanium dihalide.

4. Method according to claim 1 in which the reduced titanium halide is titanium trihalide.

5. Method according to claim 1 in which the precipitated titanium nitride is separated from the metal halide by a dilute acid leaching operation.

ARTHUR E. JACOBSEN.

References Cited in the file of this patent

UNITED STATES PATENTS

| Number | Name | Date |
|---|---|---|
| 1,015,286 | Berguis | Jan. 23, 1912 |
| 2,443,253 | Kroll et al. | June 15, 1948 |

OTHER REFERENCES

Ser. No. 292,742, Beck et al. (A. P. C.), published July 13, 1943.

J. W. Mellor's "A Comprehensive Treatise on Inorganic and Theoretical Chemistry," vol. 2, page 554, and vol. 7, 1927 ed., pages 75, 76, Longmans, Green and Co., N. Y.